Patented July 4, 1950

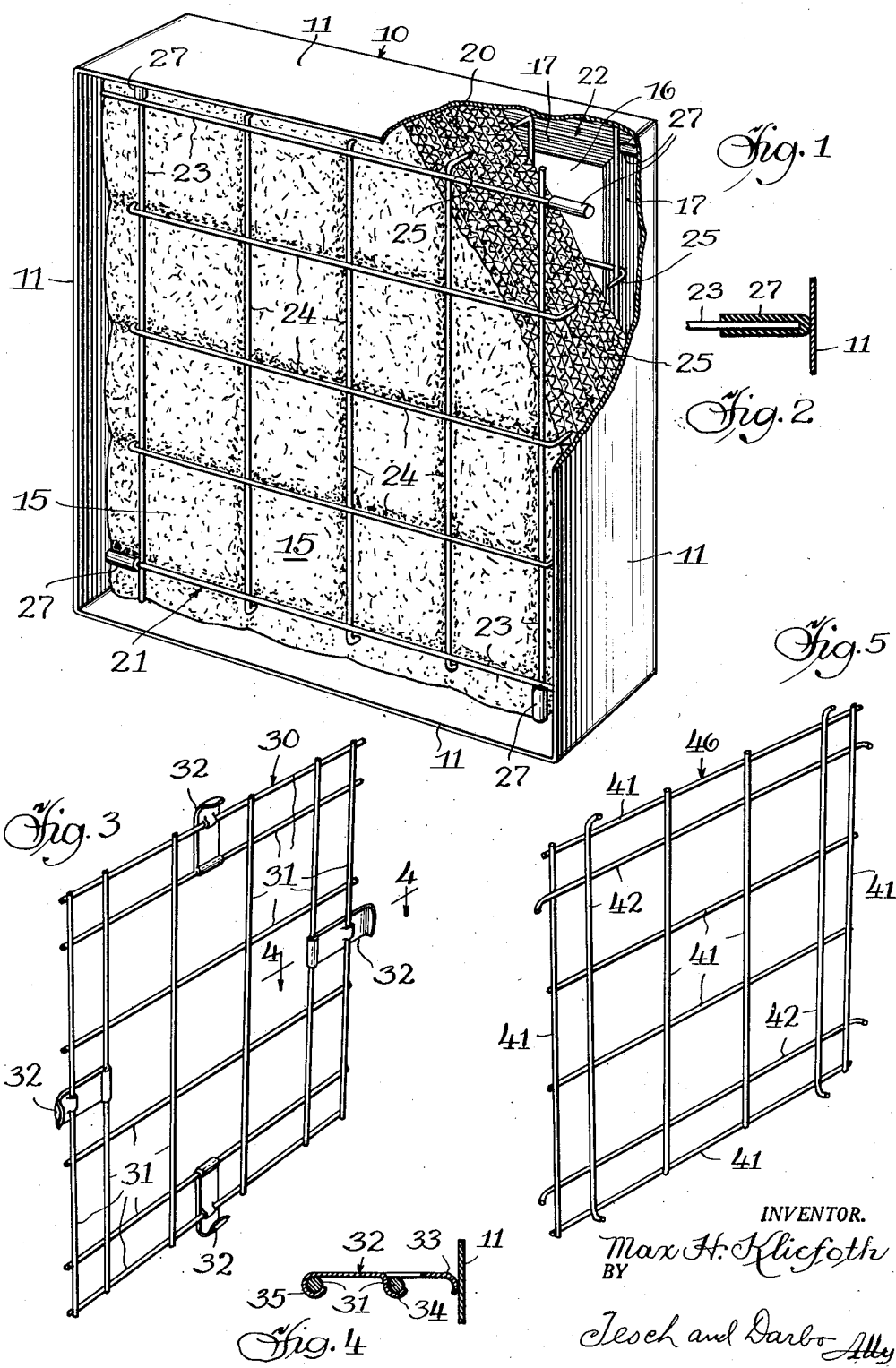

2,513,946

UNITED STATES PATENT OFFICE 2,513,946

FILTER APPARATUS

Max H. Kliefoth, Westport, Wis., assignor to Research Products Corporation, Madison, Wis., a corporation of Wisconsin Application October 2, 1946, Serial No. 700,748

2 Claims. (Cl. 183—69)

This invention relates to apparatus for filtering gases, and particularly to an improved arrangement for retaining a gas filtering body in position and facilitating its removal and insertion. The improvements are applicable to gas filtering apparatus in general, but are intended primarily for air filtering apparatus to be used in ventilating and air conditioning systems.

It is common practice in such systems to employ filters which are discarded after they have accumulated their capacity of dust or dirt, or are cleaned and re-used. In any filtering installation, and especially in large installations employing many filters, the time consumed in removing the dirty filters and replacing them with clean ones is an important factor, and it is the object of the present invention to provide an improved construction and arrangement for filtering apparatus by means of which the removal and insertion of the filters are facilitated. Specifically, the invention provides an improved filter apparatus in which the retaining members for the filters are held in place by frictional means and may be readily removed.

In the drawing:

Fig. 1 is a perspective view of the filtering apparatus of the invention with a portion thereof broken away;

Fig. 2 is a fragmental sectional view of the apparatus shown in Fig. 1, showing the frictional member employed therein;

Figs. 3 and 5 are perspective views of modified forms of the retaining screen which may be used in the apparatus shown in Fig. 1; and Fig. 4 is a fragmental sectional view of the screen shown in Fig. 3, showing the frictional member employed therein.

In the construction shown in Figs. 1 and 2, a rectangular frame 10, which has the general character of a box with open front and rear faces, is provided as a receptacle for an individual filter. Frames of this character are in general use and are called filter cells. One such cell may be all that is used, but it is more common that several are employed, and in commercial and industrial air conditioning installations it is not uncommon for hundreds of such cells to be employed in one or more banks of cells.

While the cell may be of any desired shape, the specific cell 10 is of rectangular shape and has relatively shallow side walls 11. It has open faces 15 and 16 at the front and rear respectively for the passage of the air to be filtered. The terms "front" and "rear" are used for convenience and not in a restrictive sense. Flanges 17 extend inwardly from all of the side walls at the rearward face 16, two of said flanges being visible in Fig. 1.

A body of porous filtering material 20 is arranged within the cell 10 and is shaped to fit snugly against the side walls 11 so that air cannot pass around the edges and escape being filtered.

The filtering body 20 is in the form of a relatively thick pad and may be composed of any suitable air filtering material, such as animal hair, vegetable, mineral or metal fibers or filaments, or it may be composed of a plurality of superposed layers of the expanded fibrous sheet material as is described in United States Patent No. 2,070,073. The material of the body is preferably coated with a tacky substance, such as petroleum oil or grease, and the solid particles of the air passing through the filter impinge upon and adhere to the tacky substance and are removed from the air.

The filtering body 20 is held in place by two open-mesh, gas pervious grids or screens 21 and 22 which are arranged upon the opposite sides of the filtering body 20 respectively and extend across the open faces 15 and 16 of the cell 10. The front screen 21 is composed of a plurality of intersecting elongated members, which are preferably composed of wire, and are widely spaced apart and are joined together, as by welding or soldering, where they intersect. The wires 23 adjacent to the edges of the screen are substantially straight from end to end, and the intermediate wires 24 are preferably turned inwardly at their ends to form prongs 25 which penetrate the filtering body 20. The filtering body is usually of soft flexible construction and the prongs 25 assist in preserving the shape of the body and preventing it from slumping when it is arranged in a vertical or inclined position.

At one end of each of the wires 23 there is arranged a tip member 27 of flexible elastic or resilient composition, such as rubber, plasticized cellulose nitrate, polyvinyl acetate, the copolymer of vinyl acetate and vinyl chloride, felt, cork or the like. The tip member 27 is telescoped over the end portion of the wire 23, as shown in Fig. 2, and has a solid end portion extending beyond the end of the wire and adapted to make frictional contact with the adjacent side wall 11. In the particular arrangement shown, the frictional members 27 are so arranged that there is one such member adjacent to each corner of the cell 10. The distance between the end of a frictional member 27 and the opposite end of the wire 23 carrying such member is slightly greater than the distance between the interior surfaces of the opposite walls 11 between which the particular wire extends. The length of the straight main portions of the wires 24 is sufficiently less than the said distance between the opposite walls 11 that said wires 24, and the prongs 25 at the ends thereof, do not engage the said walls. In order to insert the screen 21 into the cell, it is necessary to force it inwardly under pressure, whereby the end portions of the frictional members 27 are compressed and engage the walls 11 with firm frictional contact and the screen is held in position. The rear screen 22 is of a construction similar to that of the front screen 21.

In assembling the filter unit shown in Fig. 1, the rear screen 22 is first inserted in the cell 10. It is held with the prongs 25 thereof extending forwardly and is pushed backward into the cell until it rests against the flanges 17. The filtering body 20 is then inserted and is pushed backward until its rearward surface rests against the rear screen 22 and the prongs 25 thereof penetrate the body. The front screen 21 is then inserted with the prongs 25 thereof extending rearwardly, and is pushed backward until it makes firm contact with the forward surface of the filtering body and the prongs 25 penetrate into the body.

The operation of removing the dirty filter and replacing it with a clean one is quickly and easily performed. The forward screen 21 is removed by pulling it forward out of the cell 10, and the filtering body is then removed by a similar operation, and the clean filtering body is then inserted and the forward screen 21 replaced, the body and screen being pushed backward until the body is held firmly in place between the two screens and the prongs 25 of both screens penetrate the filtering body.

In Fig. 3 a modified form of air pervious screen is shown which may be employed as an alternative to the screens 21 and 22. The screen 30 shown in Fig. 3 is composed of spaced apart intersecting elongated members 31, which are preferably of wire. At substantially the middle of each edge portion of the screen 30 is arranged a frictional member 32 which is composed of spring metal strip, said frictional members 32 projecting from the edges of the screen and having their end projecting portions 33 turned so as to present a convex surface to the side wall 11 of the cell 10. The frictional members 32 may be attached in any suitable manner to the screen. In the specific construction shown, an intermediate portion 34 is punched out of the member and curved about the wire 31 which is adjacent to the edge of the screen, and the inner end portion 35 is turned around the next adjacent wire 31. For convenience, the two wires 31 to which the frictional member is attached are spaced apart a smaller distance than are the remainder of the wires, but this is not critical and the spacing of the wires may be uniform or non-uniform, as desired.

The dimensions of the screen 30 without the frictional members 32 are such that it may be inserted freely into the cell 10. The projecting ends of the frictional members 32 on opposite edges of the screen are spaced apart a distance somewhat greater than the distance between the interior surfaces of the cooperating side walls 11. A screen 30 may be used in place of each of the forward and rearward screens 21 and 22, and the filter and screens may be removed and inserted by pushing operations similar to those described heretofore in connection with the construction shown in Figs. 1 and 2.

In the modification of the screen members shown in Fig. 5, some of the elongated screen members themselves serve as the frictional members. The screen 40 is composed of the spaced apart intersecting elongated members 41 and 42, which are preferably composed of wire. One of the wires 42 is spaced inwardly a short distance from each of the edges of the screen. The remainder of the wires, which are designated by the numeral 41, are sufficiently short that they fit freely within the cell 10. The wires 42 are longer than the wires 41 and are turned at their ends so as to present a convex surface to the interior surfaces of the side walls 11 of the cell 10. The distance between the convex surfaces of each wire is normally slightly greater than the distance between the interior surfaces of the cooperating side walls 11, whereby, when the screen is pushed into the cell, the curved end portions of the wires 42 exert resilient frictional pressure against the side walls 11 and the screen is held firmly in position. A screen 40 may be employed in place of each of the front and rear screens 21 and 22, and the operations of removing and inserting the screens and the filtering body are similar to those described heretofore in connection with the construction of Figs. 1 and 2.

Only a few modifications of the invention have been described and illustrated, but these are by way of example, and the invention is not limited thereto, and additional modifications may be made within the scope of the invention as the same is set forth in the appended claims. For example, instead of having frictional tip members 27 at only one end, the wires 23 of the modification shown in Figs. 1 and 2 may have such frictional members at both ends thereof. Also, the wires 23 carrying the frictional members 27 may be located at intermediate points instead of adjacent to the edges of the screen. In the modifications of Figs. 3 and 5, the wires 31 and 41 may be turned inwardly at their end portions to form prongs which penetrate the filtering body. In all of the modifications, frictional means may be omitted from the rear screen, and such screen may be fastened permanently in place as by soldering or welding to the flanges 17.

What is claimed is:

1. A gas filtering apparatus comprising a filter cell of substantially rectangular shape having sides and having substantially open front and rear faces for the passage of gases therethrough, the sides of said cell having inwardly extending flanges at said rear cell face, a body of filtering material within said cell, retaining screens on opposite sides of said filtering body and extending across the open faces of said cell, said screens comprising spaced apart elongated members, one of said screens resting against the interior surfaces of said flanges, the elongated members of at least one of said screens having tips of resilient flexible composition in compressive frictional engagement with the interior surfaces of said cell, whereby said screen is removably held in place in said cell.

2. A gas filter comprising an interstitial gas-pervious body having broad faces for the ingress and egress of gas and a stiff open mesh retaining screen in contact with each of said broad faces, said screens each comprising spaced apart elongated members, the elongated members of at least one of said screens having tips of resilient flexible composition adapted to make frictional engagement with the walls of a gas passageway.

MAX H. KLIEFOTH.

REFERENCES CITED

The following references are of record in the file of this patent:

UNITED STATES PATENTS

| Number | Name | Date |
|---|---|---|
| 1,037,145 | Houser | Aug. 27, 1912 |
| 1,604,470 | Newnham | Oct. 26, 1926 |
| 1,896,700 | Cross | Feb. 7, 1933 |
| 2,124,370 | Gaarder | July 19, 1938 |
| 2,408,158 | Belsher | Sept. 24, 1946 |